United States Patent
Carlson et al.

(10) Patent No.: US 10,380,571 B2
(45) Date of Patent: *Aug. 13, 2019

(54) MERCHANT ALERT BASED SYSTEM AND METHOD INCLUDING CUSTOMER PRESENCE NOTIFICATION

(71) Applicant: VISA INTERNATIONAL SERVICE ASSOCIATION, San Francisco, CA (US)

(72) Inventors: Mark Carlson, Half Moon Bay, CA (US); Patrick Stan, Pacifica, CA (US); Ayman Hammad, Pleasanton, CA (US); Ben Rewis, Oakland, CA (US); Patrick L. Faith, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 448 days.

This patent is subject to a terminal disclaimer.

(21) Appl. No.: 15/236,294

(22) Filed: Aug. 12, 2016

(65) Prior Publication Data
US 2016/0350736 A1 Dec. 1, 2016

Related U.S. Application Data

(63) Continuation of application No. 12/767,694, filed on Apr. 26, 2010, now Pat. No. 9,449,327.
(Continued)

(51) Int. Cl.
*G06Q 20/20* (2012.01)
*G06Q 30/02* (2012.01)
(Continued)

(52) U.S. Cl.
CPC ........... *G06Q 20/206* (2013.01); *G06Q 30/02* (2013.01); *G06Q 30/0201* (2013.01);
(Continued)

(58) Field of Classification Search
CPC .. G06Q 20/206; G06Q 30/02; G06Q 30/0201; G06Q 30/0269; G06Q 50/182; G06Q 50/265; H04L 67/22
See application file for complete search history.

(56) References Cited

U.S. PATENT DOCUMENTS

| | | |
|---|---|---|
| 5,448,471 A | 9/1995 | Deaton et al. |
| 5,483,444 A | 1/1996 | Heintzeman et al. |

(Continued)

FOREIGN PATENT DOCUMENTS

| | | |
|---|---|---|
| AU | 2005279689 | 3/2006 |
| GB | 2372867 | 9/2002 |

(Continued)

OTHER PUBLICATIONS

U.S. Appl. No. 12/428,349, Final Office Action dated Feb. 29, 2012, 24 pages.
(Continued)

*Primary Examiner* — Azizul Choudhury
(74) *Attorney, Agent, or Firm* — Kilpatrick Townsend & Stock

(57) ABSTRACT

Embodiments of the present invention disclosed herein include systems and methods for sending merchant alert messages. The merchant can specify criteria indicating the types of customers for which he desires to receive alerts. Merchant alert messages can be sent based on characteristics of a customer, including the customer's proximity to the merchant. The merchant can use the alert message to provide better service to the customer or prevent the customer from engaging in transactions, depending on the contents of the merchant alert message.

18 Claims, 7 Drawing Sheets

Related U.S. Application Data

(60) Provisional application No. 61/173,371, filed on Apr. 28, 2009.

(51) Int. Cl.
*G06Q 50/18* (2012.01)
*G06Q 50/26* (2012.01)
*H04L 29/08* (2006.01)

(52) U.S. Cl.
CPC ....... *G06Q 30/0269* (2013.01); *G06Q 50/182* (2013.01); *H04L 67/22* (2013.01); *G06Q 50/265* (2013.01)

(56) References Cited

U.S. PATENT DOCUMENTS

| | | | |
|---|---|---|---|
| 5,513,250 A | 4/1996 | Mcallister | |
| 5,530,438 A | 6/1996 | Bickham et al. | |
| 5,592,560 A | 1/1997 | Deaton et al. | |
| 5,604,921 A | 2/1997 | Alanara | |
| 5,615,110 A | 3/1997 | Wong | |
| 5,642,485 A | 6/1997 | Deaton et al. | |
| 5,708,422 A | 1/1998 | Blonder et al. | |
| 5,774,882 A | 6/1998 | Keen et al. | |
| 5,852,775 A | 12/1998 | Hidary | |
| 5,878,337 A | 3/1999 | Joao et al. | |
| 5,903,830 A | 5/1999 | Joao et al. | |
| 6,012,144 A | 1/2000 | Pickett | |
| 6,049,778 A | 4/2000 | Walker et al. | |
| 6,055,570 A | 4/2000 | Nielsen | |
| 6,064,990 A | 5/2000 | Goldsmith | |
| 6,067,529 A | 5/2000 | Ray et al. | |
| 6,185,200 B1 | 2/2001 | Prasad | |
| 6,185,290 B1 | 2/2001 | Shaffer et al. | |
| 6,185,541 B1 | 2/2001 | Scroggie et al. | |
| 6,292,786 B1 | 9/2001 | Deaton et al. | |
| 6,311,169 B2 | 10/2001 | Duhon et al. | |
| 6,330,550 B1 | 12/2001 | Brisebois et al. | |
| 6,353,398 B1 | 3/2002 | Amin et al. | |
| 6,381,324 B1 | 4/2002 | Shaffer et al. | |
| 6,418,436 B1 | 7/2002 | Degen et al. | |
| 6,424,951 B1 | 7/2002 | Shurling et al. | |
| 6,442,532 B1 | 8/2002 | Kawan | |
| 6,484,148 B1 | 11/2002 | Boyd | |
| 6,505,046 B1 | 1/2003 | Baker | |
| 6,529,725 B1 | 3/2003 | Joao et al. | |
| 6,535,855 B1 | 3/2003 | Cahill et al. | |
| 6,553,100 B1 | 4/2003 | Chen et al. | |
| 6,608,556 B2 | 8/2003 | De Moerloose et al. | |
| 6,612,488 B2 | 9/2003 | Suzuki | |
| 6,636,587 B1 | 10/2003 | Nagai et al. | |
| 6,647,269 B2 | 11/2003 | Hendrey et al. | |
| 6,741,188 B1 | 5/2004 | Miller et al. | |
| 6,684,195 B1 | 6/2004 | Deaton et al. | |
| 6,775,539 B2 | 8/2004 | Deshpande | |
| 6,842,774 B1 | 1/2005 | Piccioni | |
| 6,859,451 B1 | 2/2005 | Pasternack et al. | |
| 6,873,972 B1 | 3/2005 | Marcial et al. | |
| 6,879,838 B2 | 4/2005 | Rankin et al. | |
| 6,891,911 B2 | 5/2005 | Rostoker et al. | |
| 6,912,398 B1 | 6/2005 | Domnitz | |
| 6,913,194 B2 | 7/2005 | Suzuki | |
| 6,970,850 B1 | 11/2005 | Freeny, Jr. | |
| 6,993,326 B2 | 1/2006 | Link, II et al. | |
| 7,003,497 B2 | 2/2006 | Maes | |
| 7,024,211 B1 | 4/2006 | Martin | |
| 7,024,396 B2 | 4/2006 | Woodward | |
| 7,027,801 B1 | 4/2006 | Hall et al. | |
| 7,028,052 B2 | 4/2006 | Chapman et al. | |
| 7,063,263 B2 * | 6/2006 | Swartz | G06K 17/00 235/462.45 |
| 7,092,724 B2 | 8/2006 | Fellenstein et al. | |
| 7,096,003 B2 | 8/2006 | Joao et al. | |
| 7,100,049 B2 | 8/2006 | Gasparini et al. | |
| 7,123,146 B1 * | 10/2006 | Holzman | G08B 13/2462 340/568.1 |
| 7,152,051 B1 * | 12/2006 | Commons | G06N 3/0454 706/16 |
| 7,167,830 B2 | 1/2007 | Sravanapudi et al. | |
| 7,200,566 B1 | 4/2007 | Moore et al. | |
| 7,203,300 B2 | 4/2007 | Shaffer et al. | |
| 7,310,534 B2 | 12/2007 | Northcutt | |
| 7,337,119 B1 | 2/2008 | Geschwender et al. | |
| 7,343,149 B2 | 3/2008 | Benco et al. | |
| 7,355,990 B2 | 4/2008 | Smith et al. | |
| 7,356,506 B2 | 4/2008 | Watson et al. | |
| 7,357,310 B2 | 4/2008 | Calabrese et al. | |
| 7,376,431 B2 | 5/2008 | Niedermeyer | |
| 7,389,275 B2 | 6/2008 | Kemper et al. | |
| 7,418,086 B2 | 8/2008 | Sravanapudi et al. | |
| 7,644,035 B1 | 1/2010 | Biffle et al. | |
| 7,873,540 B2 | 1/2011 | Arumugam | |
| 8,694,364 B2 | 4/2014 | Hammond et al. | |
| 8,847,761 B1 | 9/2014 | Claudatos et al. | |
| 2001/0011245 A1 | 8/2001 | Duhon | |
| 2001/0029485 A1 | 10/2001 | Brody et al. | |
| 2001/0049636 A1 | 12/2001 | Hudda et al. | |
| 2002/0077964 A1 | 6/2002 | Brody et al. | |
| 2002/0087460 A1 | 7/2002 | Hornung | |
| 2002/0095380 A1 | 7/2002 | Singhal | |
| 2002/0116322 A1 | 8/2002 | Schnall | |
| 2002/0133462 A1 | 9/2002 | Shteyn | |
| 2002/0198783 A1 | 12/2002 | Bates et al. | |
| 2003/0061110 A1 | 3/2003 | Bodin | |
| 2003/0061163 A1 | 3/2003 | Durfield | |
| 2003/0105707 A1 | 6/2003 | Audebert et al. | |
| 2003/0182191 A1 | 9/2003 | Oliver et al. | |
| 2004/0039683 A1 | 2/2004 | McGeorge | |
| 2004/0064401 A1 | 4/2004 | Palaghita et al. | |
| 2004/0078340 A1 | 4/2004 | Evans | |
| 2004/0093265 A1 | 5/2004 | Ramchandani et al. | |
| 2004/0103028 A1 | 5/2004 | Littman et al. | |
| 2004/0103049 A1 | 5/2004 | Kerr | |
| 2004/0155960 A1 | 8/2004 | Wren et al. | |
| 2004/0199470 A1 | 10/2004 | Ferry, Jr. et al. | |
| 2004/0215654 A1 | 10/2004 | Eberwine et al. | |
| 2005/0021561 A1 | 1/2005 | Noonan | |
| 2005/0043995 A1 | 2/2005 | Nguyen | |
| 2005/0136949 A1 | 6/2005 | Barnes, Jr. | |
| 2005/0149391 A1 | 7/2005 | O'Shea et al. | |
| 2005/0154665 A1 | 7/2005 | Kerr | |
| 2005/0170814 A1 | 8/2005 | Joao | |
| 2005/0177423 A1 | 8/2005 | Swanson, Sr. | |
| 2005/0199775 A1 | 9/2005 | Kaminski et al. | |
| 2005/0248459 A1 | 11/2005 | Bonalle et al. | |
| 2005/0267809 A1 | 12/2005 | Zheng | |
| 2006/0059110 A1 | 3/2006 | Madhok et al. | |
| 2006/0086786 A1 | 4/2006 | Spencer, II | |
| 2006/0089905 A1 | 4/2006 | Song et al. | |
| 2006/0149671 A1 | 7/2006 | Nix et al. | |
| 2006/0190628 A1 | 8/2006 | Linton et al. | |
| 2006/0200396 A1 | 9/2006 | Satterfield et al. | |
| 2006/0202025 A1 | 9/2006 | Calabrese et al. | |
| 2006/0277142 A1 | 12/2006 | McGeorge et al. | |
| 2006/0281439 A1 | 12/2006 | Benco et al. | |
| 2007/0006286 A1 | 1/2007 | Singhal | |
| 2007/0096909 A1 | 5/2007 | Lally | |
| 2007/0100773 A1 | 5/2007 | Wallach | |
| 2007/0136584 A1 | 6/2007 | Diorio et al. | |
| 2007/0239569 A1 | 10/2007 | Lucas et al. | |
| 2008/0004950 A1 | 1/2008 | Huang et al. | |
| 2008/0010203 A1 | 1/2008 | Grant | |
| 2008/0040261 A1 | 2/2008 | Nix et al. | |
| 2008/0147484 A1 | 6/2008 | Davis et al. | |
| 2008/0156869 A1 | 7/2008 | Carr et al. | |
| 2008/0163257 A1 | 7/2008 | Carlson et al. | |
| 2008/0169937 A1 | 7/2008 | Lowry | |
| 2008/0182590 A1 | 7/2008 | Ruckart et al. | |
| 2008/0183480 A1 | 7/2008 | Carlson et al. | |
| 2008/0183581 A1 | 7/2008 | Coppolani et al. | |
| 2008/0200144 A1 | 8/2008 | Ginsberg et al. | |
| 2008/0288385 A1 | 11/2008 | Geschwender et al. | |
| 2009/0043658 A1 | 2/2009 | Webb et al. | |

(56) References Cited

U.S. PATENT DOCUMENTS

| | | | |
|---|---|---|---|
| 2009/0051501 | A1 | 2/2009 | Tuttle |
| 2009/0106846 | A1 | 4/2009 | Dupray et al. |
| 2009/0144308 | A1 | 6/2009 | Huie et al. |
| 2009/0156190 | A1 | 6/2009 | Fisher |
| 2009/0234748 | A1* | 9/2009 | Skowronek ............ G06Q 20/10 705/21 |
| 2009/0271322 | A1 | 10/2009 | Lay et al. |
| 2010/0102122 | A1 | 4/2010 | Skowronek |
| 2010/0274566 | A1 | 10/2010 | Carlson |
| 2010/0287250 | A1 | 11/2010 | Carlson et al. |

FOREIGN PATENT DOCUMENTS

| | | |
|---|---|---|
| WO | 0046769 | 8/2000 |
| WO | 0193213 | 12/2001 |
| WO | 2006024080 | 3/2006 |
| WO | 2009026318 | 2/2009 |
| WO | 2009035469 | 3/2009 |
| WO | 2010129333 | 11/2010 |

OTHER PUBLICATIONS

U.S. Appl. No. 12/428,349, Non-Final Office Action dated Oct. 31, 2011, 13 pages.
U.S. Appl. No. 12/767,694, Advisory Action dated Apr. 14, 2016, 3 pages.
U.S. Appl. No. 12/767,694, Advisory Action dated Jun. 8, 2015, 4 pages.
U.S. Appl. No. 12/767,694, Final Office Action dated Jan. 14, 2016, 11 pages.
U.S. Appl. No. 12/767,694, Final Office Action dated Mar. 12, 2015, 11 pages.
U.S. Appl. No. 12/767,694, Final Office Action dated Dec. 20, 2012, 15 pages.
U.S. Appl. No. 12/767,694, Non-Final Office Action dated Jul. 1, 2015, 11 pages.
U.S. Appl. No. 12/767,694, Non-Final Office Action dated Aug. 29, 2014, 12 pages.
U.S. Appl. No. 12/767,694, Non-Final Office Action dated Aug. 6, 2012, 12 pages.
U.S. Appl. No. 12/767,694, Notice of Allowance dated Jun. 17, 2016, 8 pages.
International Application No. PCT/US2010/032756, International Preliminary Report on Patentability dated Nov. 10, 2011, 6 pages.
International Application No. PCT/US2010/032756, International Search Report and Written Opinion dated Dec. 13, 2010, 7 pages.
Wolf, New Web Service Warns of Identity Theft, www.greenspun.com/bboard/q-anda-fetch-msg.tcl?msgid=003yBJ, Oct. 23, 2000, 2 pages.

* cited by examiner

300

| MERCHANT ALERTS |
|---|

Send Notification Via    ○ E-Mail    ○ Text Msg.    ○ Both

310

Notify Me of Desirable Consumers Who are In / Near My Store and:

320
- Average Transaction Value greater than $_____
- Have spent more than $_____ in my store
- Have shopped at my store more than _____ times
- Typically purchase high end items
- Typically purchase newly released items
- Are high net worth consumers Notify Me of Undesirable Consumers Who are In / Near My Store and:

330
- Have had more than _____ disputed charges in the last year
- Are known fraud risks
- Are known felons
- Have had more than _____ transactions resulting in charge backs to me

Fig. 3

MERCHANT ALERT BASED SYSTEM AND METHOD INCLUDING CUSTOMER PRESENCE NOTIFICATION

CROSS-REFERENCES TO RELATED APPLICATIONS

This application is a continuation of U.S. patent application Ser. No. 12/767,694, filed Apr. 26, 2010, which claims benefit of U.S. Patent Application No. 61/173,371, filed on Apr. 28, 2009, the entire contents of which are herein incorporated by reference in its entirety for all purposes.

BACKGROUND

Merchants are always looking for ways to increase sales and profits. One way this is achieved is by providing attentive and responsive customer service. In the context of a local merchant with primarily local repeat customers, this may be as simple as the merchant saying hello to a customer he recognizes when the customer enters the store. The merchant may ask the customer how his day is going, or ask about an item that was recently purchased from the merchant. Such interactions may help the customer feel like she is a valued customer. Because the local merchant may know preferences of his repeat customers, the merchant may make suggestions for new products or services the customer may be interested in, which in turn could generate additional sales.

In the modern retail environment, it is becoming exceedingly rare for a merchant to have such individualized and personal interactions with his customers. In many cases, a customer may walk into a store for the first time, make a purchase, and never enter the store again. The ability for a merchant to get to know his customers and his customers' purchasing behaviors is made even more difficult when there is no face to face interaction, such as in online transactions. When a merchant has limited to no information about his customers, providing attentive and responsive customer service to make the customer feel valued becomes exceedingly difficult.

On the opposite side of providing better customer service to increase sales is the desire to reduce losses. The local merchant may know from experience that a customer who has just entered his store has a reputation as a shoplifter. The merchant may then put extra effort into monitoring the customer while he is in the store. Just as described above, in a modern retail environment, the merchant would rarely have such individualized and personal knowledge about his customers.

Embodiments of the present invention address these problems and other problems individually and collectively.

BRIEF SUMMARY

Embodiments of the present invention disclosed herein include systems and methods for sending merchant alert messages. The merchant can specify criteria indicating the types of customers for which he desires to receive alerts. Merchant alert messages can be sent based on characteristics of a customer, including the customer's proximity to the merchant. The merchant can use the alert message to provide better service to the customer or prevent the customer from engaging in transactions, depending on the contents of the merchant alert message.

In one embodiment, a method of sending a merchant alert is provided. At least one criteria is retrieved from a database. The at least one criteria is specified by a merchant. The at least one criteria specifies when an alert message will be sent to the merchant. A plurality of consumers can be monitored to determine if the at least one criteria is satisfied by a consumer of the plurality of consumers. When the at least one criteria is satisfied by the consumer, the alert message is sent to the merchant.

In another embodiment a method of specifying merchant alerts is provided. A merchant selects at least one condition, that when satisfied by a consumer, will cause an alert message to be sent to the merchant. When the at least one condition is satisfied, an alert message is sent to a merchant's communication device.

These and other embodiments of the invention are described in further detail below.

BRIEF DESCRIPTION OF THE DRAWINGS

FIG. 3 depicts a merchant alert criteria specification screen.

DETAILED DESCRIPTION

Figure 1:
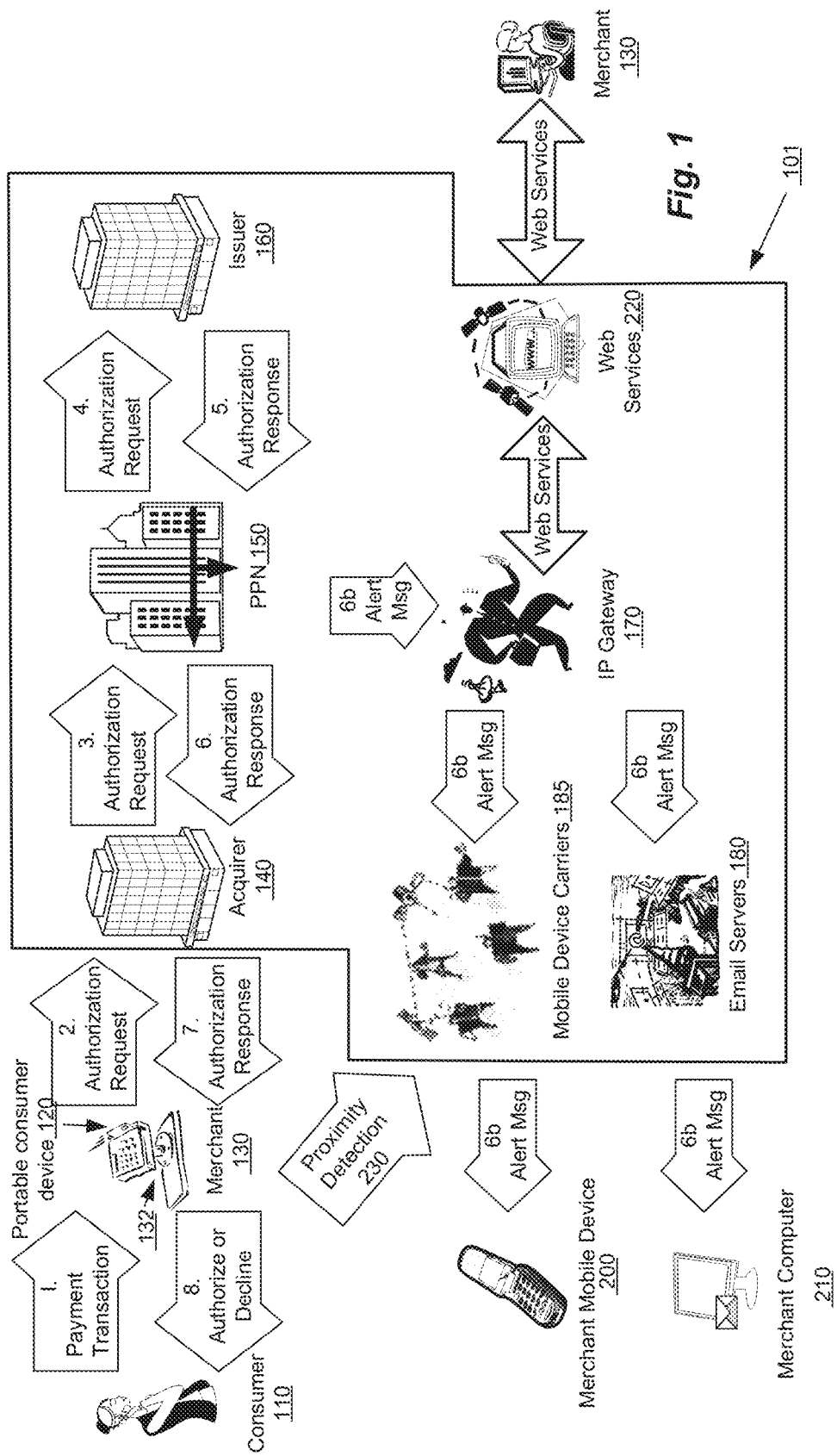
FIG. 1 shows an intelligent alert message system, according to an embodiment of the invention.

One embodiment of the invention is directed to a method for sending an alert message to a notification device operated by a merchant. The merchant may specify criteria related to consumers the merchant is interested in. An intelligent alert messaging system, also referred to as a merchant alert, or simply alerts system, may monitor large numbers of consumers, and when a consumers satisfies the criteria specified by the merchant, an alert can be sent to the merchant's notification device. The alert message can include further information about the consumer who has satisfied the criteria.

Illustratively, a merchant may wish to be notified when a consumer who is typically a big spender is conducting a transaction in the merchant's store. An intelligent alert messaging system may monitor transactions, such as credit card transactions, for a large number of consumers. When a consumer engages in a transaction at the merchant's store, the intelligent alert messaging system can retrieve a profile of the consumer. The profile can include a lot of information about the consumer, such as if the consumer is classified as a big spender. If the consumer is classified as a big spender, an alert message, such as a text message, can be sent to the merchant, letting the merchant know that a big spender is currently conducting a transaction. The merchant can then take action, such as introducing themselves to the customer and asking if the customer was able to find everything they needed. The merchant may make recommendations for additional products or services the customer may be interested in, based on the contents of the alert message.

In some embodiments, the merchant need not wait until the customer has already begun the payment process before being notified of his presence. Through the use of location services, the intelligent alert messaging system may monitor the location of a large number of consumers. When one of the consumers enters a store of a merchant who has enrolled for the merchant alerts service, the intelligent alert messaging system can retrieve a profile of the consumer. If the consumer profile matches criteria specified by the merchant, such as if the consumer is a big spender, the intelligent alert messaging system can send an alert to the merchant. The merchant can, just as above, introduce themselves to the customer, and hopefully increase sales by tailoring the customer service provided to the customer based on the customers profile. For example, if the customer profile indicates a big spender, the merchant may try to steer the customer toward higher end, more expensive, goods and services.

In addition to being useful for identifying customers that are desirable to the merchant, merchant alerts are also useful in identifying undesirable customers. For example, a merchant can specify criteria to be notified of customers who have had more than a certain number of disputed purchases. Disputed purchases can include purchases where the authorized card holder later disputes making the purchase. As is well known in the field of payment processing, disputed purchases can require the merchant to expend effort in resolving the dispute. These efforts could be better utilized in more productive activities. Upon receiving a merchant alert that indicates a customer with large numbers of disputed purchases is conducting a transaction or has entered the store, the merchant could seek out that customer. The customer could then be informed that his business is not welcome. Although this may cause the merchant to lose some sales, for some merchants this may be preferable to having to deal with what could be referred to as "difficult" customers.

Embodiments of the invention are also useful in e-commerce transactions. Although location information is not as meaningful in online transactions, merchant alerts could still allow a merchant to provide improved customer service to online customers. For example, a customer who is paying for an item on a merchant's website could trigger the sending of an alert message to the merchant. In some embodiments, the alert message may be received by an automated system operated by the merchant. The alert could include customer profile information that the automated system could use advantageously. For example, if a customer with a big spender profile is checking out on a merchant's website, a webpage could be displayed with offers from the merchant to increase the amount purchased. Just as a live merchant would suggest higher end products to a big spender, the merchants website could do the same.

Embodiments of systems and methods are described below in more detail with reference to the included figures.

I. Systems

FIG. 1 is a diagram illustrating an alert system 100, in accordance with an embodiment of the invention. The alert system 100 includes a consumer 110, a portable consumer device 120, a merchant 130, an access device 132, an acquirer 140, a payment processing network 150, an issuer 160, an IP gateway 170, mobile device carriers 185, e-mail servers 180, a merchant mobile device 200, a merchant computer 210, and Web services 220. The merchant mobile device 200 and the merchant computer 210 are examples of merchant devices (e.g. notification devices). Further descriptions of notification devices and portable consumer devices are provided below.

The consumer 110, who can also be referred to as a customer, can be a consumer that uses the portable consumer device 120 to conduct a transaction, and may further operate one or more consumer devices, including a mobile device (not shown) which may comprise a mobile phone. The portable consumer device operated by the consumer 110 may, in addition to being used for conducting transactions, provide location information to the IP Gateway 170. Operating in conjunction with merchant proximity detection equipment or a mobile device network, the consumer's 110 physical location may be provided 230 to the IP Gateway 170. Proximity detection will be explained in further detail with respect to FIG. 2.

The merchant 130 has an access device 132 for interacting with the portable consumer device 120, and the acquirer 140 is associated with the merchant 130. The acquirer 140 is in communication with the issuer 160 through the payment processing network 150.

The alert system 100 also includes an IP gateway 170 that is in communication with payment processing network 150. IP gateway 170 receives the transaction data from the payment processing network 150 and can generate merchant alert messages. IP gateway 170 is also in communication 230 with proximity detection equipment to monitor the physical location of the consumer 110. IP gateway 170 is also in communication with the mobile device carriers 185, e-mail servers 180, and Web services 220. The mobile device carriers 185 are in operative communication with the merchant mobile device 200, and the mail servers 180 are in operative communication with the merchant computer 210. The alert messages that are generated from IP gateway 170 are sent to the merchant mobile device carriers 185 and/or mail servers 180 to be sent to the merchant device (i.e., merchant mobile device 200, and/or the merchant computer 210).

The web services 220 may be in operative communication with the merchant 130 for enrolling in the merchant alert messaging service provided by the alert system 100. The web services 220 may also be in communication with a merchant 130 for allowing the merchant 130 to specify alert criteria which indicates when a merchant alert will be sent by the alert system 100.

The consumer 110 may be an individual or organization such as a business that is capable of purchasing goods or services or conducting any suitable transaction with the merchant 130.

The merchant 130 may refer to any suitable entity or entities that can conduct a transaction with the consumer 110. The merchant 130 may have a physical location which sells goods and services to the consumer 110. The merchant 130 may also have an e-commerce business to allow transactions to be conducted by the merchant 130 through the Internet. Other examples of a merchant 130 include a department store, a gas station, a drug store, a grocery store, or other suitable business. In some embodiments, merchant 130 will have proximity detection equipment installed at his physical location. Proximity detection will be explained in further detail with respect to FIG. 2.

The access device 132 may be any suitable device for communicating with the merchant 130 and for interacting with the portable consumer device 120. The access device 132 can be in any suitable location such as at the same location as the merchant 130. The access device 132 may be in any suitable form. Some examples of access devices 132 include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. The access device 132 may use any suitable contact or contactless mode of operation to send or receive data from the portable consumer devices 120.

If the access device 132 is a POS terminal, any suitable POS terminal may be used and may include a reader, a processor, and a computer-readable medium. Reader may include any suitable contact or contactless mode of operation. For example, exemplary card readers can include radio frequency (RF) antennas, optical scanners, bar code readers, magnetic stripe readers, etc. to interact with portable consumer device 120.

The acquirer 140 refers to any suitable entity that maintains an account for the merchant 130. In some embodiments, the issuer 160 may also be the acquirer 140.

The payment processing network 150 refers to a network of suitable entities that have information related to an account associated with the portable consumer device 120. This information includes data associated with the account on the portable consumer device 120 such as profile information, data, and other suitable information.

The payment processing network 150 may have or operate a server computer and may include a database. The database may include any hardware, software, firmware, or combination of the preceding for storing and facilitating retrieval of information. Also, the database may use any of a variety of data structures, arrangements, and compilations to store and facilitate retrieval of information. The server computer may be coupled to the database and may include any hardware, software, other logic, or combination of the preceding for servicing the requests from one or more client computers. The server computer may use any of a variety of computing structures, arrangements, and compilations for servicing the requests from one or more client computers.

The payment processing network 150 may include data processing subsystems, networks, and operations used to support and deliver authorization services, exception file services, and clearing and settlement services. An exemplary payment processing network 150 may include VisaNet™. Networks that include VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 150 may use any suitable wired or wireless network, including the Internet.

The issuer 160 refers to any suitable entity that may open and maintain an account associated with the portable consumer device 120 used by consumer 110. Some examples of issuers may be a bank, a business entity such as a retail store, or a governmental entity.

The IP gateway 170 refers to an entity that generates and delivers notifications and contact alert messages to various delivery channels. The IP gateway 170 may include one or more servers and databases for generation of the contact alert messages and retrieval of data. The IP gateway 170 may be part of the payment processing network 150 or may be a separate entity in communication with the payment processing network 150. The IP Gateway 170 may also be in communication with a profile creation server, which will be explained in further detail with respect to FIG. 2.

The e-mail servers 180 are server computers configured to receive an e-mail from a network connection and store the e-mail in memory for future retrieval.

The mobile device carriers 185 refer to entities that provide wireless infrastructures for wireless data transfer and communication via cellular phone or other mobile devices. Example of such entities are AT&T™, Verizon Wireless™, T-Mobile™, etc.

The mobile device 200 may be in any suitable form. For example, a suitable mobile device 200 can be hand-held and compact so that it can fit into a consumer's wallet and/or pocket (e.g., pocket-sized). Some examples of a mobile device 200 include desktop, tablet, or laptop computers, cellular phones, personal digital assistants (PDAs), pagers, payment cards, security cards, access cards, smart media, transponders, and the like. In some embodiments, the mobile device 200 and the portable consumer device 120 are embodied in the same device. In some embodiments, the mobile device 200 may comprise a processor, and a computer readable medium coupled to the processor. The computer readable medium comprises code, executable by the processor, for implementing a method comprising: transmitting information indicative of the location of the mobile device to the IP Gateway.

The merchant computer 210 may be a personal computer or a laptop. The merchant computer 210 may run an operating system such as Microsoft Windows™ and may have a suitable browser such as Internet Explorer™.

The web services 220 may be in the form of a server and a Website which allows merchants to enroll in the merchant alert messaging service. Web services 220 may be provided by the issuer 160 or the payment processing network 150.

Figure 2:
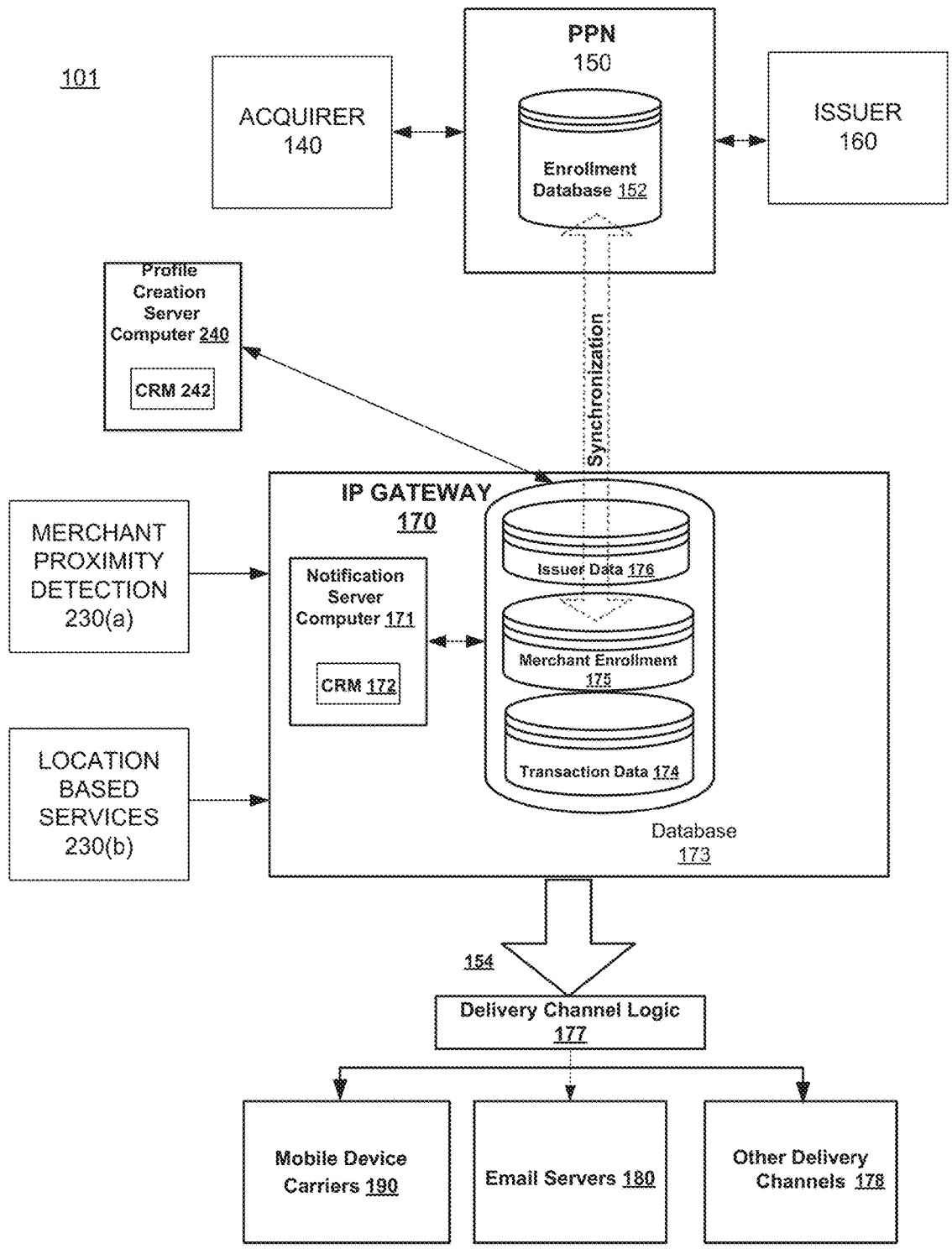
FIG. 2 shows a subsystem of the intelligent alert message system, according to an embodiment of the invention.

FIG. 2 is a diagram illustrating a subsystem 101 of the alert system 100. FIG. 2 illustrates more details about the IP gateway 170. The IP gateway 170 includes a notification server computer 171. The notification server computer comprises a processor and a computer-readable medium 172 coupled to the processor (not shown). The computer readable medium comprises code executable by the processor for implementing methods disclosed herein, including retrieving from a database, at least one criteria specified by a merchant, the at least one criteria indicating when an alert message will be sent to the merchant; monitoring a plurality of consumers to determine if the at least one criteria is satisfied by a consumer of the plurality of consumers; and sending the alert message to the merchant when the at least one criteria is satisfied by the consumer.

The notification server computer 171 is in communication with a database 173. In some embodiments, database 173 may be included in the notification server computer 171. Database 173 contains transaction data 174, issuer data 176, and merchant enrollment data 175 (which may include alert preference data). Merchant enrollment data 175 may be synchronized with the enrollment database 152 in the payment processing network 150 via the synchronization link 156. The enrollment database 152 can contain data related to merchants who are enrolled in the merchant alert messaging service. As shown in FIG. 2, IP gateway 170 is in communication with payment processing network 150, and Delivery Channel Logic 177 via the network connection 154 which may be in any suitable form. The network connection 154 may include, for example, at least a portion of the Internet. Delivery channel logic 177 can be in communication with IP gateway 170, and any or all of mobile service carriers 185, e-mail servers 180, and other delivery channels 178.

The IP Gateway 170 and/or the notification server computer 171 can utilize data stored in transaction data 174 to develop a profile of consumers based on their transaction history. Because payment processing network 150 will generally process all transactions conducted by consumers when they use their credit or debit cards, a detailed history of transactions can be maintained. By examining this transaction information, detailed profiles of consumers can be developed. Profiles can include information such as average transaction amounts, types of merchants, payment history, and any other information that can be derived by mining the transaction data 174. In general, consumer profiles may describe the buying patterns of the consumers. Profile information will be used when determining if an alert is sent to a merchant.

The IP Gateway 170 and/or the notification server computer 171 can also be in communication with a profile creation server computer 240. Profile creation server computer 240 may use transaction data 174 which contains details of consumer transactions to create a profile of all consumers. Just like the IP Gateway 170 and/or Notification server 171, profile creation server may use the transaction data of a consumer to determine the buying patterns of the consumer. Again, this information can be used to determine when an alert message is sent to a merchant. In addition to using the transaction data 174, profile creation server 240 may also interface with external systems (not shown) including social networking systems, such as Facebook. Profile creation server computer 240 may utilize information, such as interests of the consumers or photographs of the consumers in order to develop a more detailed profile of the consumers.

Profile creation server 240 may also interface with various systems accessible via the internet to enhance the profiles created for the consumers. For example, news sites may be accessed to determine additional information about the consumer. Certain public documents, such as property closings, or bankruptcy filings may also be accessed in order to develop a more accurate profile for the consumer. In some embodiments, profile creation server computer 240 is owned and operated by the Payment Processing Network 150, while in other embodiments, it may be owned and operated by a third party. Regardless of who owns and operates the profile creation server computer 240, IP Gateway 170 and/or the notification server computer 171 will have access to the detailed consumer profiles. In some embodiments, detailed consumer profile information is stored in database 173. In other embodiments, detailed consumer profiles are stored elsewhere, and IP Gateway 170 and/or notification server 171 access the detailed profiles remotely.

In some embodiments IP Gateway 170 also communicates with merchant proximity detection systems 230(*a*). As described above, in some embodiments, a merchant is sent an alert upon the entrance of a customer into the merchants store, or other location as specified by the merchant. In order to know when to send an alert, IP Gateway 170 needs to know where the customer is physically located. Many portable consumer devices are able to be read from a distance. For example, credit cards which contain an RFID element can be read from distances ranging from a few inches to tens of feet. In some embodiments, the merchant may install remote readers at their physical store location. For example, the merchant may install such a reader at the entrance door to his store.

A consumer entering the store will thus pass by the remote reader. If they are currently in possession of a mobile consumer device that is capable of being read remotely, the device information can be read. Reading the device information is transparent to the customer, who may not even know that the device is being read. This portable consumer device information can then be sent from the merchant proximity detection 230(*a*) equipment to the IP Gateway. The IP Gateway will then know that the consumer is in the store. The IP Gateway can retrieve the consumer's profile, and based on the notification criteria specified by the merchant, can send a notification message to the merchant if the notification criteria have been met.

In some embodiments, the portable consumer device itself is sophisticated enough to track its own location. For example, may smartphones are Global Positioning System (GPS) enabled, and can identify their own location anywhere on the planet. In other cases, the devices may utilize the facilities provided by the mobile device carriers to determine their location. Regardless of how the location information is derived, it should be understood that the device itself is capable of determining its own position.

In general, the ability for a portable consumer device to determine its own position will be referred to as Location Based Services 230(*b*). This position information can be conveyed to the IP gateway through any number of communications means. In some embodiments, the portable consumer device itself may run an application that periodically communicates with the IP Gateway to report its position. In other embodiments, the IP Gateway communicates with the mobile device carriers to determine the device's position.

Regardless of the specific location identification mechanism or the communications channel used to transmit the location information to the IP Gateway, it should be understood that the IP Gateway is informed about the consumer's position. In some embodiments, as part of enrolling for merchant alerts, the merchant may specify the location of their store. The merchant may specify the location in terms of an address, a latitude and longitude, a neighborhood, location of a shopping mall, or any other location identification mechanism. Although in most cases the merchant desires to know when the consumer has entered or is in the proximity of the merchant's store, embodiments of the disclosure are not so limited. Any location desired may be specified by the merchant.

In operation, a consumer may enter a merchant's store. Through the use of either merchant proximity detection 230(*a*) or location based services 230(*b*), the IP Gateway can be notified the consumer has entered the merchants store. The IP Gateway and/or notification server can then retrieve the consumer's profile. This profile can then be compared to merchant specified notification criteria. If the consumer profile matches the merchant criteria, a notification can be sent to the merchant. The merchant can then receive the notification, and take whatever action the merchant would deem as most beneficial given the profile of the consumer.

In some embodiments, location information may not be available. When a consumer conducts a payment transaction with the merchant, his payment account information will be sent to the payment processing network. The IP Gateway is in communication with the payment processing network, can be notified that a transaction is occurring with the merchant. The IP Gateway and/or the Notification Server may then determine if a merchant alert should be sent using the same criteria as described above.

In some embodiments, the consumer may be conducting a transaction on the merchant's website. In such cases, sending an alert to the merchant himself may be ineffective, as the merchant is not physically able to act on the alert. An alert could be sent to the merchant's web server. The web server can receive the alert message, and process the alert accordingly. For example, for a consumer whose profile indicates he is a big spender, the merchant's web site could be programmed to present an offer for higher end, more expensive, products and services.

FIG. 3 depicts a merchant alert criteria specification screen. In some embodiments, a merchant enrolls for merchant alerts. As part of the enrollment process, the merchant may specify information, such as location information, in order for the merchant alert system to know when a customer has entered a location as specified by the merchant. The merchant may also specify contact information for where a merchant alert should be sent. For example, if a merchant alert is to be sent to an e-mail account, the e-mail address may be specified. If the alert is to be sent via a text message, a phone number of the merchant's mobile device may be specified. In addition to enrolling for merchant alerts, the merchant may also specify criteria for when an alert should be sent.

Merchant Alert screen 300 depicts an exemplary screen wherein a merchant may specify particular criteria for when an alert will be sent to the merchant. Merchant alert screen 300 can include a notification mechanism selection 310 control. In the example of FIG. 3, the notification options presented are e-mail and text message, although it should be understood that this is exemplary and not limiting. Any communications mechanism that can provide a substantially real time alert to a merchant has been contemplated. Substantially real time can include notifications that are sent immediately after a determination is made that a consumer has satisfied the merchant specified criteria.

Substantially real time can also include notifications that are sent after a slight delay. For example, a customer may enter the merchant's store, but a notification is not sent until 1 minute, 5 minutes, or 10 minutes later, and only if the criteria is still satisfied. Such a delay advantageously may reduce "false positive" notifications. For example, if a customer walks into the merchants store, but then immediately walks out again, it would be wasteful to send the merchant an alert related to a customer who is no longer in the store. A slight delay may provide for a determination that the customer is actually in the store and has been in the store long enough to indicate he is shopping.

Merchant alert screen 300 may also allow a merchant to specify when an alert for a desirable customer is sent. For example, selections 320 allow a merchant to select that notifications should be sent for customers who have a high average transaction value. In some embodiments, the merchant may specify a threshold value for what is to be considered a high average transaction value. In some embodiments, merchant criteria can include criteria related to the customer's behavior with respect to the merchant. For example, how much the customer has spent in the merchant's store or how many times the customer has visited the merchants store. Just as above, in some embodiments, the merchant selects parameters that will determine when the criteria has been met.

In some embodiments, merchant criteria selection can include customer behavior that is unrelated to the specific merchant. For example, customers who typically purchase high end items, typically purchase newly released items, or are high net worth customers. The ability to know more general information about a customer can be very helpful to a merchant. For example, if a merchant knows that a particular customer has a high net worth, the merchant may attempt to steer the customer toward higher end products and services. As explained above, such information can be obtained from the detailed consumer profiles created by the consumer profile creation server.

In addition to notifications sent about desirable consumers, the merchant may also specify criteria 330 for notification of undesirable consumers. For example, the merchant may wish to know about customers in the store who have a large number of disputed transactions, are known fraud risks, or are known felons. Such information can be useful to a merchant when deciding if he wants to conduct business with a particular customer. In some cases, the merchant may determine that it is not worth the potential hassle of dealing with a particular customer. In some embodiments, just as above, the merchant specifies criteria that are specifically related to the merchant. For example, the number of transactions conducted by the customer that have directly resulted in chargebacks to the merchant. As above, for some criteria, merchants may specify parameters for when an alert message is sent.

Although several exemplary criteria have been presented with respect to FIG. 3, it should be understood that the presented criteria are exemplary, and not limiting. In some embodiments, merchants may specify notification criteria using screens as depicted in FIG. 3. In other embodiments, criteria specification may be performed using a series of drop down boxes with associated parameter entry controls. For example, a generic interface could be presented, in which the merchant selects a category, such as average transactions value. The merchant could then select a comparison, such as greater than, less than, or equals. The merchant then may specify an amount. In yet other embodiments, the merchant may specify criteria through a phone call with a customer service representative associated with the merchant alert system. The representative may then enter the criteria on behalf of the merchant.

In some embodiments, merchant criteria specification can be altered by the merchant at any time. For example, the merchant may specify certain criteria for weekdays and different criteria for the weekends. This may allow a merchant to receive alerts that are more targeted to customers that may be shopping on those particular days. In some embodiments, merchant alert criteria can be specified based on time of day to reflect different shopping patterns based on the time of day.

Regardless of the particular criteria chosen, it should be understood that merchant alert criteria can be anything that can be determined from the customer's transaction history or created profile. As profile creation server develops increasingly sophisticated profiles, additional criteria may be added. The merchant is able to select only criteria that is meaningful to the particular merchant. For example, a consumer electronics merchant may wish to be notified about customers who purchase a lot of high end electronics, whereas a clothing store merchant would not be interested in that information. Merchant alert criteria selection is flexible in order to allow the merchant to select criteria most pertinent to the merchant's business.

II. Methods

Referring to FIG. 1, a method of conducting a transaction according to an embodiment of the invention, such as a payment transaction, is shown with respect to system 100. In a typical payment transaction, a consumer 110 purchases goods or services at merchant 130 using the portable consumer device 120 (arrow 1). An authorization request message comprising transaction data is generated by a processor in the access device 132 after the portable consumer device 120 interacts with the access device 132. The authorization request message may comprise, for example, a transaction identifier, the BIN (bank identification number) and expiration date associated with the portable consumer device 120, the purchase amount, a transaction identifier (which can be used to reference the specific transaction) and a merchant code such as a merchant category code (MCC). In one embodiment, the authorization request message may comprise the XML format. In other embodiments, other formats may be used. The authorization request message is then forwarded from the merchant 130 to the acquirer 140 (arrow 2). After receiving the authorization request message, acquirer 140 then sends the authorization request message to the payment processing network 150 (arrow 3).

Once the payment processing network 150 receives the authorization request message, the payment processing network is aware that a customer is conducting a transaction in the merchant's store or on the merchant's website. This information can be sent to the alert system 100 in order to determine if this particular consumer satisfies any of the criteria specified by the merchant, based on the merchant specified criteria and the customer profile. If one or more criteria is satisfied, an alert message may be sent to the merchant, for example through the merchant's mobile device 200 or the merchant's computer 210.

The payment processing network 150 then forwards the authorization request message to the issuer 160 (arrow 4). After the issuer 160 receives the authorization request message, the issuer 160 sends an authorization response message back to the payment processing network 150 to indicate whether or not the current transaction is authorized (or not authorized) (arrow 5). The payment processing network 150 can then forward the authorization response message to the acquirer 140 (arrow 6). The acquirer 140 then sends the authorization response message to merchant 130 (arrow 7), and the transaction can continue, such as having the merchant 130 provide the purchased goods or services to the consumer 110 (arrow 8).

In embodiments in which location features are active, it is not necessary for a customer to actually conduct a transaction before the merchant alert criteria are examined. As explained with respect to FIG. 2, merchant proximity detection 230(*a*) or location based services 230(*b*) may be used to notify 230 the merchant alert system that a customer has entered the merchant's store. At that point, the alert system can evaluate the merchant criteria in relation to the consumer profile as explained above.

Figure 4:
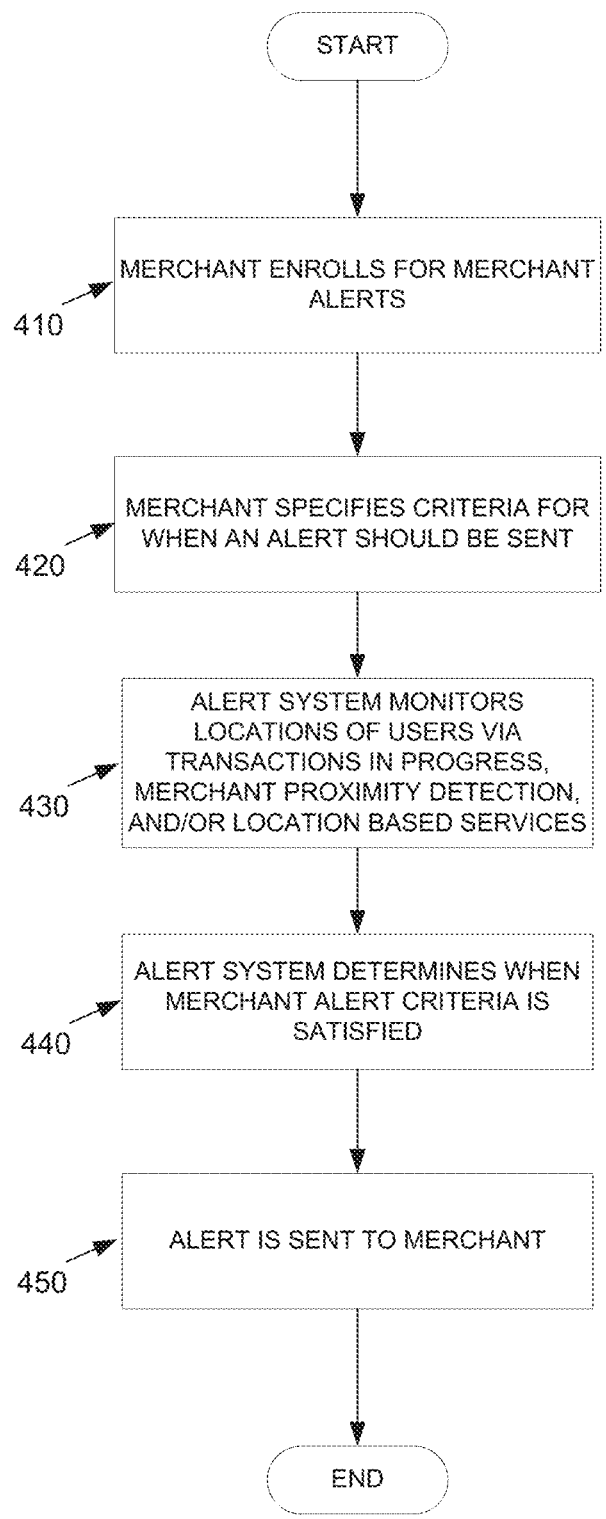
FIG. 4 depicts a high level flow diagram of a merchant alert.

FIG. 4 depicts a high level flow diagram of a merchant alert. The process may begin at step 410 with a merchant enrolling for merchant alerts. As part of the enrollment process, the merchant may specify his store location in order for the location based alerts to be utilized. The merchant may specify his location in any number of ways, such as the address of his store, a latitude and longitude, an address of the mall his store is located in, an area proximately located to his store, or any other location identification mechanism.

In addition, as part of the enrollment process 410, the merchant may specify the devices he wishes to receive alerts on. For example, if the merchant wishes to receive e-mail alerts, he may provide an e-mail address. If the merchant wishes to receive text message alerts, he may specify a cell phone number where the alerts should be sent. In some embodiments, the merchant may also specify the capabilities of the device on which he is receiving alerts. For example if the merchant wishes to receive alerts via e-mail sent to an e-mail account, and the e-mail alerts will be read using a mobile device, such as a smartphone, the merchant may specify the capabilities of the smartphone. If the smartphone is not capable of displaying pictures, it would be useless to send a picture as part of the merchant alert. By specifying the capabilities of the device that will receive the merchant alert, the merchant alert can be tailored to only provide information that can be utilized by the device.

At step 420 the merchant may specify criteria for when an alert should be sent. As explained with respect to FIG. 3, the criteria can be specified in any number of ways. In step 420, the merchant specifies the criteria for sending a merchant alert that would be most useful for the particular merchant. It is expected that such criteria would vary widely depending on the type of merchant. The criteria could even vary between merchants of the same type of goods, as each merchant may have different modes of operating their business. The ability of a merchant to specify his own criteria as to when a merchant alert is sent advantageously allows the merchant to tailor the alerts to his individual business situation.

At step 430, the alert system monitors locations of consumers. The locations can be monitored by determining when a consumer is actually conducting a transaction. The transaction processing can be monitored, and if a transaction is being conducted, it can be assumed that the consumer is actively engaging the merchant. As explained above, the consumer's location may also be monitored through the use of merchant proximity detection mechanisms as well as location based services mechanisms.

At step 440, the alert system may determine that the consumer is currently engaging the merchant in some form. The consumer may be in or near the merchant's store or conducting a transaction with the merchant (either on or off line). The alerts system can then determine if any of the criteria specified by the merchant has been satisfied. This may be accomplished by examining the merchant specified alert criteria, and in some embodiments, profile information about the consumer.

At step 450, if the merchant alert criteria is satisfied, and alert message may be sent to the merchant. The alert can be in any suitable form, including e-mail or text message. The alert may be sent immediately upon satisfaction of the criteria, or it may be delayed for a period of time to reevaluate if the criteria is still satisfied.

Figure 5:
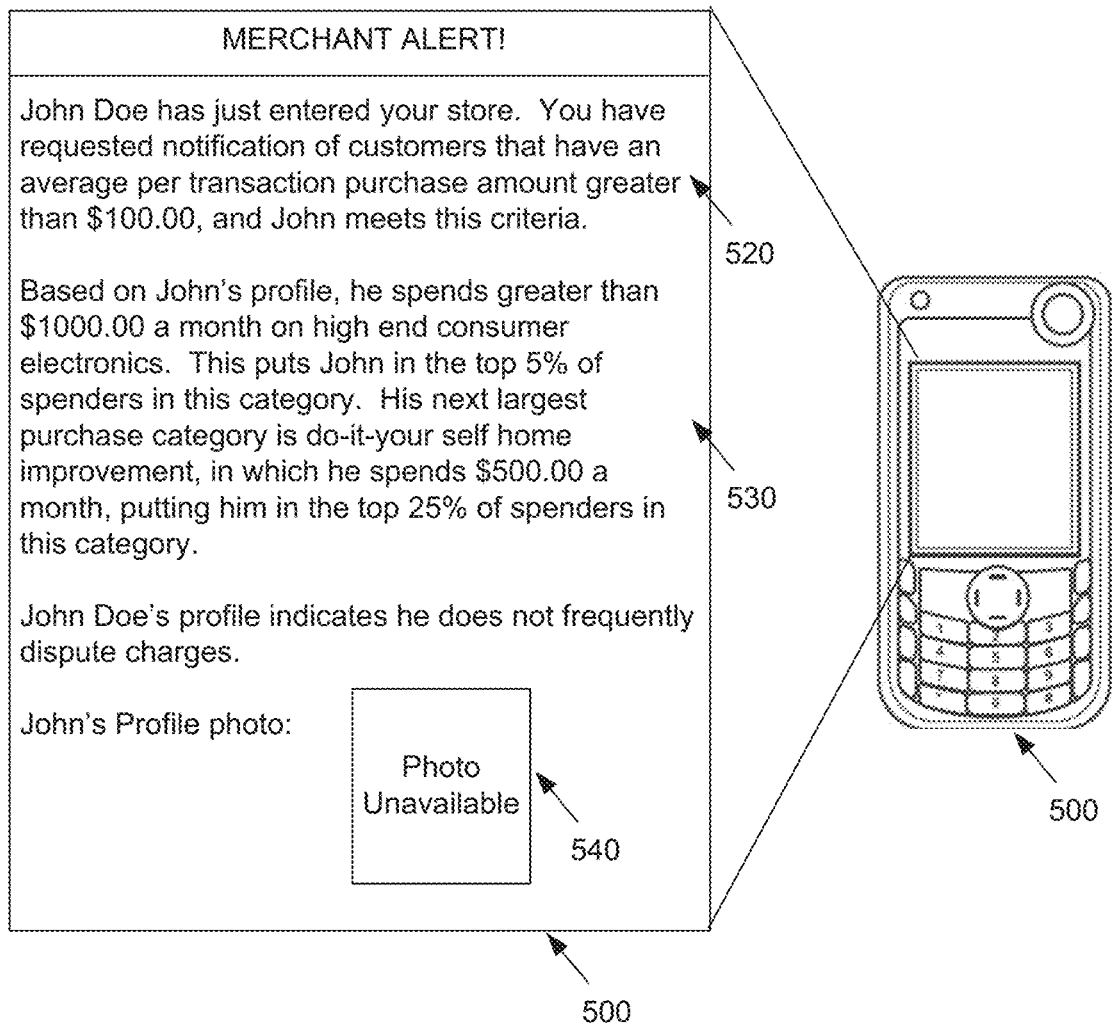
FIG. 5 depicts an exemplary merchant alert message.

FIG. 5 depicts an exemplary merchant alert message. Alert message 500 may be sent to a merchant's notification device 510. As described above, merchant's notification device can be any suitable device such as a merchant's mobile phone 200 or a merchant's computer 210. The contents and media formats included in the alert message 500 can be tailored based on the capabilities of the merchant's notification device. In some embodiments, the merchant himself may specify the capabilities of his notification device 500.

In some embodiments, merchant alert 500 may include an indication 520 of why the alert is being sent. For example, the alert message may specify that a certain customer has entered his store, and that this customer satisfies criteria that were previously specified by the merchant.

In some embodiments, merchant alert 500 may include additional information 530 about the customer that is the subject of the alert. For example, information obtained by the profile creation server 240 may be used to provide profile information about the identified customer. The consumer profile could include information about the customers purchasing behavior. The merchant may advantageously use this information to provide better and personalized service to the customer. For example, if a consumer profile indicates the customer purchases large amounts of consumer electronics, the merchant may direct the customer to consumer electronics items that the merchant is selling. By including profile information in the merchant alert, the merchant may be able to approach the customer already armed with knowledge of the customers' needs and desires. As such, the merchant may advantageously be able to provide customized customer service using personal information about the customer, despite the fact that the merchant may have never seen this particular customer before.

In some embodiments, merchant alert 500 can include a photograph 540 of the identified customer. The profile creation server could associate a photograph, if available, with the customer. If no photograph is available, it can not be displayed. Including a photograph advantageously allows a merchant to identify the physical customer in his store. For a large merchant, who may have many customers in his store at any given time, simply knowing that a certain customer is in the store may not be helpful, unless the merchant can particularly identify the customer.

It should be understood that merchant alert 500 is merely exemplary. More, less, or different information could be included in various embodiments. In some embodiments, the merchant himself may specify what information is included in the alert. Likewise, it should be understood that the alert may only contain information that is applicable to the device that is receiving the alert. If the device is not capable of displaying a photo, then the alert may not include a photo.

III. Portable Consumer Devices and Computer Apparatuses

Figure 6:
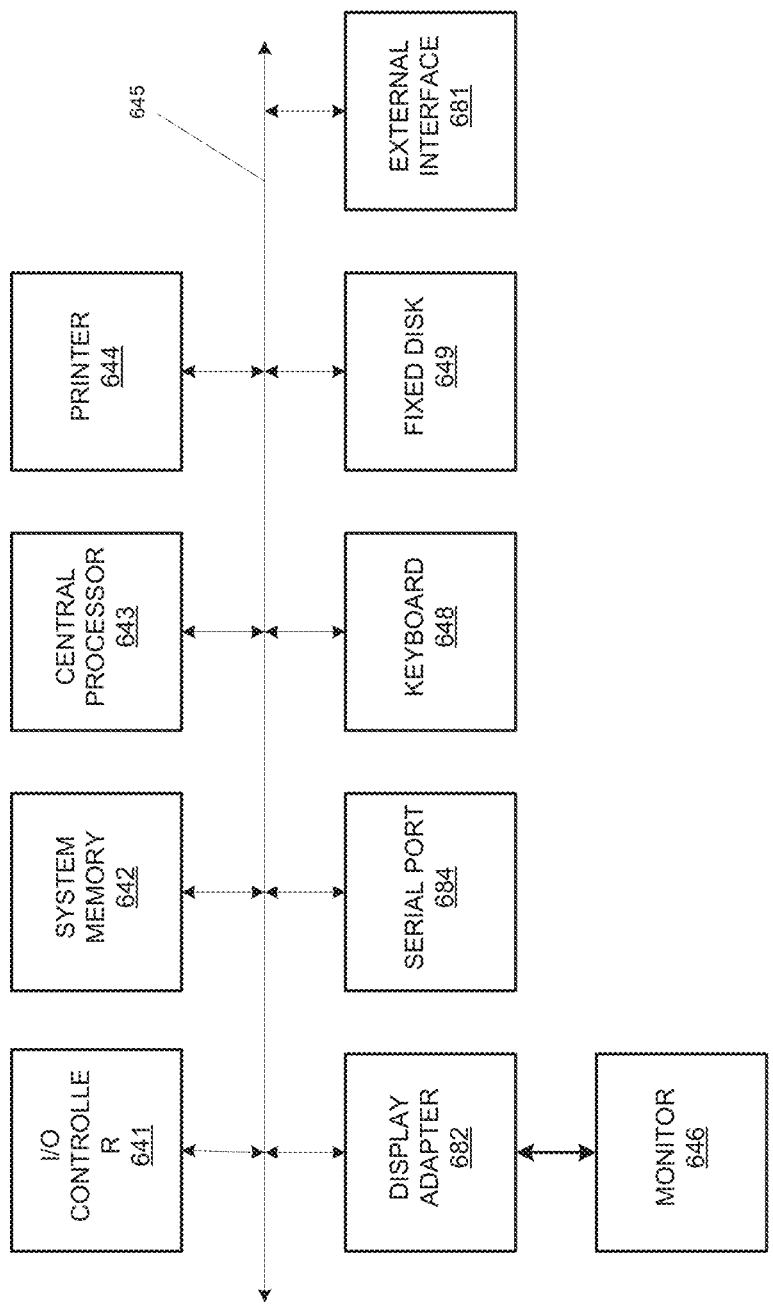
FIG. 6 depicts an exemplary computing device.

The various participants and elements in FIGS. 1 and 2 may operate one or more computer apparatuses to facilitate the functions described herein. Any of the elements in FIGS. 1 and 2 may use any suitable number of subsystems to facilitate the functions described herein. Examples of such subsystems or components are shown in FIG. 6. The subsystems shown in FIG. 6 are interconnected via a system bus 645. Additional subsystems such as printer 644, keyboard 648, fixed disk 649, monitor 646, which is coupled to display adapter 682, and others are shown. Peripherals and input/output (I/O) devices, which couple to I/O controller 641, can be connected to the computer system by any number of means known in the art, such as serial port 684. For example, serial port 684 or external interface 681 can be used to connect the computer apparatus to a wide area network such as the Internet, a mouse input device, or a scanner. The interconnection via system bus 645 allows a central processor 643 to communicate with each subsystem and to control the execution of instructions from system memory 642 or fixed disk 649, as well as the exchange of information between subsystems. The system memory 642 and/or fixed disk 649 may embody a computer readable medium, such as a tangible (i.e., physical or durable) computer readable medium. The computer readable medium may take the form of a hard drive, flash memory, magnetic strip, optical device, or other memory.

Figure 7:
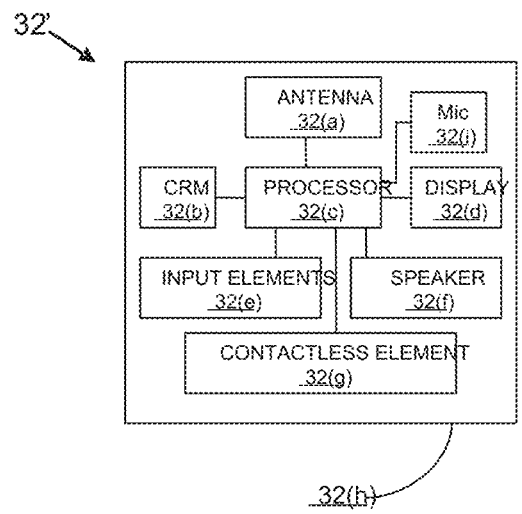
FIG. 7 shows block diagram of a mobile device.

FIG. 7 shows block diagram of a mobile device, such as a wireless phone, and subsystems that may be present in computer apparatuses in systems according to embodiments of the invention. An exemplary portable consumer device 32' in the form of a mobile device may comprise a computer readable medium and a body as shown in FIG. 7. (FIG. 7 shows a number of components, and the portable consumer devices according to embodiments of the invention may comprise any suitable combination or subset of such components.) The computer readable medium 32(b) may be present within the body 32(h), or may be detachable from it. The body 32(h) may be in the form a plastic substrate, housing, or other structure. The computer readable medium 32(b) may be a memory, such as a tangible (i.e. physical or durable) memory that stores data and may be in any suitable form including a hard drive, magnetic stripe, a memory chip, uniquely derived keys (such as those described above), encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32'.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The mobile device 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32' and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32' and an interrogation device. Thus, the portable consumer device 32' is capable of communicating and transferring data and/or control instructions via both cellular network and near field communications capability.

The portable consumer device 32' may also include a processor 32(c) (e.g., a microprocessor or a group of processors working together) for processing the functions of the portable consumer device 32' and a display 32(d) to allow a consumer to see phone numbers and other information and messages. The portable consumer device 32' may further include input elements 32(e) to allow a consumer to input information into the device, a speaker 32(f) to allow the consumer to hear voice communication, music, etc., and a microphone 32(i) to allow the consumer to transmit her voice through the portable consumer device 32'. The portable consumer device 32' may also include an antenna 32(a) for wireless data transfer (e.g., data transmission).

Figure 8:
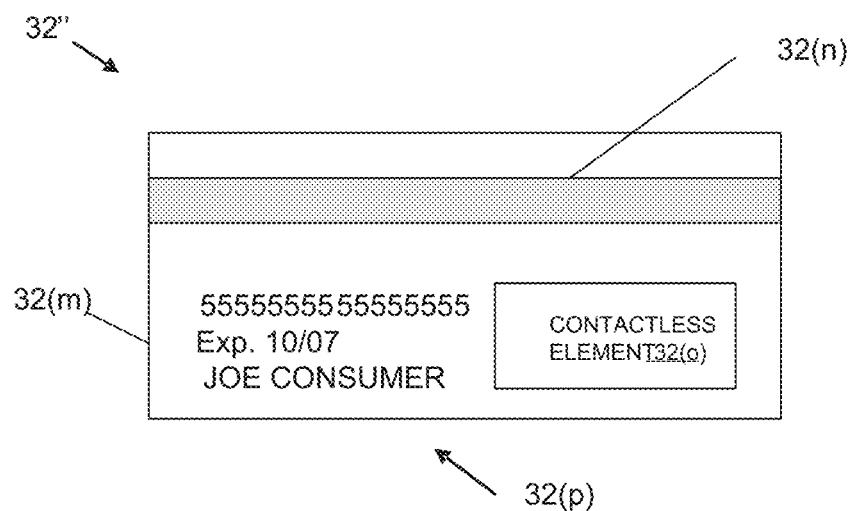
FIG. 8 depicts an exemplary portable consumer device.

An example of a portable consumer device 32" in the form of a card is shown in FIG. 8. FIG. 8 shows a plastic substrate 32(m). A contactless element 32(o) for interfacing with an access device 34 may be present on or embedded within the plastic substrate 32(*m*). Consumer information 32(*p*) such as an account number, expiration date, and consumer name may be printed or embossed on the card. Also, a magnetic stripe 32(*n*) may also be on the plastic substrate 32(*m*).

As shown in FIG. 8, the portable consumer device 32" may include both a magnetic stripe 32(*n*) and a contactless element 32(*o*). In other embodiments, both the magnetic stripe 32(*n*) and the contactless element 32(*o*) may be in the portable consumer device 32". In other embodiments, either the magnetic stripe 32(*n*) or the contactless element 32(*o*) may be present in the portable consumer device 32".

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, an optical medium such as a CD-ROM, or other physical memory devices. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method for alerting, comprising:
providing an interface allowing a merchant to arbitrarily specify criteria for an alert, the criteria comprising a past transaction type, an average transaction amount, or a transaction volume;
receiving an indication from a merchant proximity system of a consumer entering a store of the merchant;
retrieving a profile of the consumer based on the indication;
retrieving the criteria based upon the indication;
determining, by a server computer, that the criteria is satisfied by the consumer by comparing the profile of the consumer to the criteria;
generating an alert message based on the determination; and
sending the alert message to the merchant before the merchant conducts a transaction with the consumer.

2. The method of claim 1, wherein the interface includes criteria indicative of fraud.

3. The method of claim 1, wherein the criteria include one or more of the consumer having more than a merchant-specified predetermined number of disputed purchases with a payment processing network, the consumer being a known fraud risk, the consumer being a felon, and the consumer having more than a merchant-specified predetermined number of transactions resulting in charge backs to the merchant.

4. The method of claim 1, further comprising determining that the consumer entered the store of the merchant based on device information of a portable consumer device of the consumer, wherein the indication received from the merchant proximity system includes the device information.

5. The method of claim 4, wherein the merchant proximity system obtains the device information of the portable consumer device using a contactless reader.

6. The method of claim 1, further comprising monitoring the transaction, wherein the transaction is conducted with a portable consumer of the consumer, the transaction conducted at a point of sale terminal located within the store of the merchant.

7. The method of claim 1, wherein the alert message comprises information regarding the criteria that is satisfied by the consumer.

8. The method of claim 1, wherein the alert message is a text message or an email that is sent to the merchant.

9. The method of claim 1, wherein the alert message comprises a prediction, based on past transactions of the consumer, of a type of transaction that will be engaged in by the consumer.

10. The method of claim 1, wherein the alert message comprises an indication that the consumer should not be allowed to engage in any transactions with the merchant.

11. The method of claim 1, comprising receiving a selection of the criteria from the merchant via the interface.

12. The method of claim 1, wherein the criteria are different between weekdays and weekends.

13. A server computer, comprising:
a processor; and
a memory operatively coupled to the processor and storing program instructions that, when executed by the processor, cause the processor to
provide an interface allowing a merchant to arbitrarily specify criteria for an alert, the criteria comprising a past transaction type, an average transaction amount, or a transaction volume,
receive an indication from a merchant proximity system of a consumer entering a store of the merchant,
retrieve a profile of the consumer based on the indication,
retrieve the criteria based upon the indication,
determine that the criteria is satisfied by the consumer by comparing the profile of the consumer to the criteria,
generate an alert message based on the determination, and
send the alert message to the merchant before the merchant conducts a transaction with the consumer.

14. The server computer of claim 13, wherein the interface includes criteria indicative of fraud.

15. The server computer of claim 13, wherein the program instructions, when executed by the processor, further cause the processor to determine that the consumer entered the store of the merchant based on device information of a portable consumer device of the consumer, wherein the indication received from the merchant proximity system includes the device information.

16. The server computer of claim 13, wherein the program instructions, when executed by the processor, further cause the processor to monitor the transaction, wherein the transaction is conducted with a portable consumer of the consumer, the transaction conducted at a point of sale terminal located within the store of the merchant.

17. The server computer of claim 13, wherein the alert message is a text message or an email that is sent to the merchant.

18. A computer-readable storage medium embodying information indicative of instructions for causing one or more machines to perform operations comprising:

provyding an interface allowing a merchant to arbitrarily specify criteria for an alert, the criteria comprising a past transaction type, an average transaction amount, or a transaction volume;

receiving an indication from a merchant proximity system of a consumer entering a store of the merchant;

retrieving a profile of the consumer based on the indication;

retrieving the criteria based upon the indication;

determining, by a server computer, that the criteria is satisfied by the consumer by comparing the profile of the consumer to the criteria;

generating an alert message based on the determination; and sending the alert message to the merchant before the merchant conducts a transaction with the consumer.

\* \* \* \* \*